United States Patent [19]
Dhong et al.

[11] Patent Number: 6,076,140
[45] Date of Patent: Jun. 13, 2000

[54] SET ASSOCIATIVE CACHE MEMORY SYSTEM WITH REDUCED POWER CONSUMPTION

[75] Inventors: Sang Hoo Dhong, Austin, Tex.; Philip George Emma, Danbury, Conn.; William Robert Reohr, Pleasantville, N.Y.; Joel Abraham Silberman, Austin, Tex.

[73] Assignee: International Business Machines Corporation, Armonk, N.Y.

[21] Appl. No.: 09/187,340

[22] Filed: Nov. 6, 1998

Related U.S. Application Data

[62] Division of application No. 08/724,878, Oct. 3, 1996.
[51] Int. Cl.[7] .................................................. G06F 12/06
[52] U.S. Cl. .......................... 711/105; 711/128; 713/324
[58] Field of Search .................................. 711/104, 219, 711/105, 118, 127, 128; 365/227; 713/300, 320, 322, 323, 324

[56] References Cited

U.S. PATENT DOCUMENTS

| | | | |
|---|---|---|---|
| 5,018,061 | 5/1991 | Kishigami et al. | 711/3 |
| 5,029,126 | 7/1991 | Yamaguchi | 365/49 |
| 5,691,956 | 11/1997 | Chang et al. | 365/239 |
| 5,715,426 | 2/1998 | Takahashi et al. | 365/189.07 |
| 5,778,428 | 7/1998 | Batson et al. | 711/128 |
| 5,783,958 | 7/1998 | Lysinger | 327/202 |
| 5,784,712 | 7/1998 | Byers et al. | 711/219 |
| 5,848,428 | 12/1998 | Collins | 711/127 |
| 5,918,044 | 6/1999 | Levitan et al. | 711/125 |

*Primary Examiner*—Eddie P. Chan
*Assistant Examiner*—Kevin L. Ellis
*Attorney, Agent, or Firm*—Whitham, Curtis & Whitham; Paul J. Otterstedt

[57] ABSTRACT

A memory design which facilitates incremental and store requests off an applied base address request increases the bandwidth of cache via the use of an internal address generation facility built into the memory's decoding circuitry. The introduction of an internal address generation facility simplifies extraneous control of typical requesters built into a memory system. The memory design also reduces power consumed by requests which exploit the memory's internal address generation facility. Power consumption is further reduced in a set associative cache memory system by enabling one set of sense amplifiers during an incremental fetch.

5 Claims, 7 Drawing Sheets

SET ASSOCIATIVE CACHE MEMORY SYSTEM WITH REDUCED POWER CONSUMPTION

CROSS REFERENCE TO RELATED APPLICATION

This application is a division of application Ser. No. 08/724,878 filed Oct. 3, 1996.

BACKGROUND OF THE INVENTION

1. Field of the Invention

The present invention generally relates to memory systems for digital computers and, more particularly, to a new memory design which facilitates incremental fetch and store requests off an applied base address request.

2. Background Description

In cache memories, sequential instructions are retrieved from incremental address locations, J, J+1, etc., each cycle. With the exception of a branch, instructions reside in sequential memory locations because program flow is purely sequential. Therefore, instructions can be sequentially prefetched from cache and stored in an instruction queue. Similarly, data request usually have a sequential ordering, but certain situations arise in which it is convenient to store and retrieve data using an address with stride dimension other than +1; for example, +N or −N, where N equals 1, 2, 3, etc. It is desirable to exploit this naturally arising order of memory requests.

SUMMARY OF THE INVENTION

It is therefore an object of the present invention to increase the bandwidth of cache via the use of an internal address generation facility built into the memory's decoding circuitry.

According to one aspect of the invention, the introduction of an internal address generation facility simplifies extraneous control of typical requesters built into a memory system. Within a processor, one may note that by prefetching data and instruction requests with a higher bandwidth memory, often the latency of stalled processes, waiting for cache data, can be reduced.

It is a further object of this invention to reduce power consumed by requests which exploit the memory's internal address generation facility.

According to another aspect of the invention, power consumption is reduced while maintaining memory access times by selectively gating data bits vital to the memory's logic flow at an earlier stage in the memory when the gating or steering address bits are known in advance of the data arriving to that stage.

These arid other advantages of the invention will be described in terms of three embodiments to illustrate the performance, area, and complexity trade-offs available to a designer.

BRIEF DESCRIPTION OF THE DRAWINGS

The foregoing and other objects, aspects and advantages will be better understood from the following detailed description of a preferred embodiment off the invention with reference to the drawings, in which.

DETAILED DESCRIPTION OF PREFERRED EMBODIMENTS OF THE INVENTION

Figure 1:
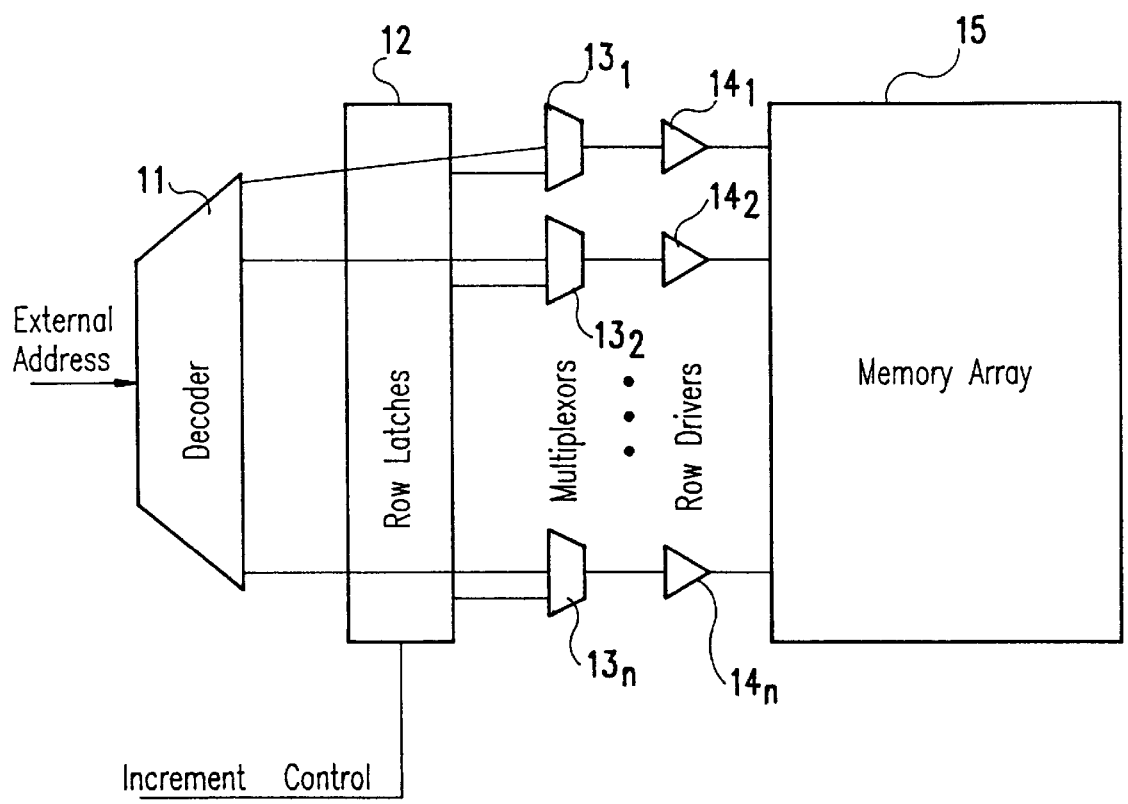
FIG. 1 is a block diagram showing a dual access mode memory with latched wordlines according to a first embodiment of the invention.

Referring now to the drawings, and more particularly to FIG. 1, there is shown a block diagram of the first embodiment of the invention. An external address is input to a decoder 11 which provides decoded or partially decoded row address outputs to row latches 12 and to a plurality of multiplexers $13_1, 13_2, \ldots, 13_n$, one for each row (wordline). Shifting capability is built into the latches 12. A single shift moves the decoded latch address to point to the next sequential address. An addresses selected by the multiplexers is supplied by corresponding row drivers $14_1, 14_2, \ldots, 14_n$ to the memory array 15. For the sake of simplicity of illustration, the column decoder and related circuitry has not been shown in FIG. 1; however, one skilled in the art will understand the purpose and function of such circuitry.

In this embodiment, a mechanism is incorporated for improving the branch request. Typically, when a branching instruction is encountered and predicted to be taken, the instructions at the branch target locations in memory are fetched. Unfortunately, if the branch is mispredicted, some number of machine cycles are required to fetch the correct sequence of instructions (into the instruction queue), decode them, and resume execution. Modern microprocessors contain many mechanisms to reduce the cycles that elapse between the time it is determined a branch is mispredicted and the correct next instruction executed. In this application, the invention functions as a hardware mechanism to reduce the penalty for mispredicted branches. The approach is to fetch from the instruction cache both the set of instructions to be executed if the branch is taken and the set needed if the branch is not taken. This prefetching eliminates a fetch cycle when the branch is resolved. The difficulty in this approach is the cache normally handles only a sequential access or a target access. This invention enables both types of access to occur. Further, it facilitates scanning for the next branch because instructions fetched on the sequential path are delivered to the processor earlier with the hardware in this disclosure than otherwise.

In FIG. 1, the means for enabling both sequential and target access consists of latching the decoded rows (wordlines) of the cache memory in latches 12. The next sequential access can then be undertaken without the need to decode the address simply by incrementing the latches, thereby shortening the access time and resulting in earlier delivery of the next group of instructions. The access location can be incremented and the sequential instructions read out by shifting the single active decoded row (wordline) select bit in the row latches, driving it through the multiplexers and then the row driver, and enabling the sense amplifiers to drive the output data (not shown for simplicity). Target accesses can be started at the input to the address decoders while the sequential address is underway.

The second access to the memory array (target access) must be synchronized appropriately with the sequential access for error free operation. If the target access corresponds to the predicted branch that is taken, the decoded form of the target address can be latched in the row latches. In the next cycle, the sequential access continues to fetch along the predicted path. If the target access corresponds to a branch that was predicted but not taken, the row (wordline) latches will still contain the decoded address for continued sequential fetching along the fall-through path. The benefit in reducing the mispredicted branch penalty is that the target instructions were already fetched and can immediately be decoded.

The memory with latched row address (wordlines) shown in FIG. 1 includes a multiplexer $13_i$ between the row (wordline) latch and the row (wordline) driver to select between target and sequential accesses. Shifting capability is built into the latch 12, containing the fully decoded address, to enable incrementing the location of the next sequential access. In some configurations, the memory may be organized in such a way that column (not shown for simplicity) decoders (bitlines) could define the high order address and the row decoders could define the low order address. In these configurations, the high order bits need only be shifted when the address rolls over from the highest row decoder to the lowest while incrementing.

Another application for the first embodiment shown in FIG. 1 is to facilitate the storage of an entire line into cache which may, for example, consist of eight sequentially addressable memory locations. The first "seed" address is stored through the normal decode 11. Its decoded form is captured in the row driver latches 12. The address is incremented by shifting. Finally, the store request is launched through the row drivers to the memory cells. After the memory is initialized with the first "seed" or "base" address, further incremental stores are simply generated off the current "seed" address captured in the row latches 12. The sequence is repeated until all memory locations have been stored to. Since data has to be sourced to the memory for each newly generated address, the data path has to be synchronized with the memory's internally generated address launches, and depending on implementation, may have to be wave pipelined within the memory to keep up with the addresses.

Figure 2:
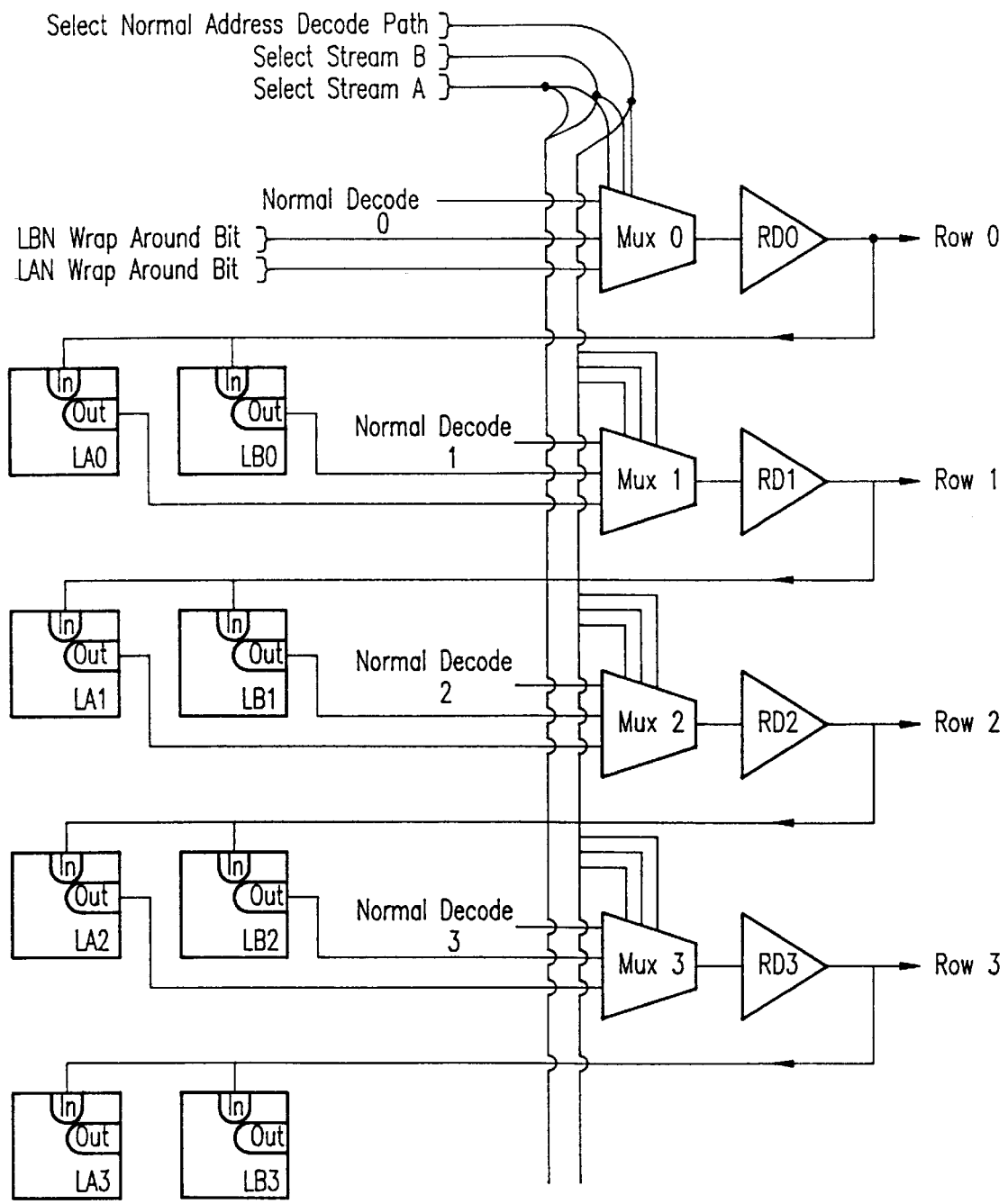
FIG. 2 is a block diagram showing a second embodiment of the invention which is an extension of the first embodiment that treats multiple streams of incremental addresses.

FIG. 2 shows an extension to FIG. 1 which treats multiple streams of incremental address requests (A, B, . . . ). It is composed of latch elements LA0–3 for stream A, latch elements LB0–3 for stream B, row drivers RD0–3, and multiplexers mux0–3. The multiplexers choose which decoded address is driven through the row drivers. Each memory cycle, the decoded address is chosen from either the address stream A, address stream B, or the normal memory decode path by applying select signals "select stream A", "select stream B", or "select normal address decode path" respectively. Base addresses are stored in latch "stream A" or "stream B" by selectively gating new decoded row bits into the latches through latch input port labeled "In" (the clocks to accomplish the gating are not shown for simplicity).

One difference between FIGS. 1 and 2 is that the address incrementation, accomplished with shift register latches in FIG. 1, is hard wired into the circuit interconnect of FIG. 2. For example, latch LAO stores row O's decoded address and feeds row driver RD1 through muxi. Clearly, should one desire, address increments other than J+1, J+N where N=−1, 2, 3 etc., can be obtained with various interconnect schemes that pass the decoded address to row drivers other than the nearest neighbors (or they can be obtained in FIG. 1 by shifting more than once before launching a request). A further difference between FIGS. 1 and 2 is that FIG. 2 shows the number of latches per row driver may be increased to support multiple address strands, say for example A and B. In any event, a processor's control logic determines what incremental address request, J−1, J+1, J+2, etc, or stream, A or B, is issued each cycle.

Figures 3, 3A:
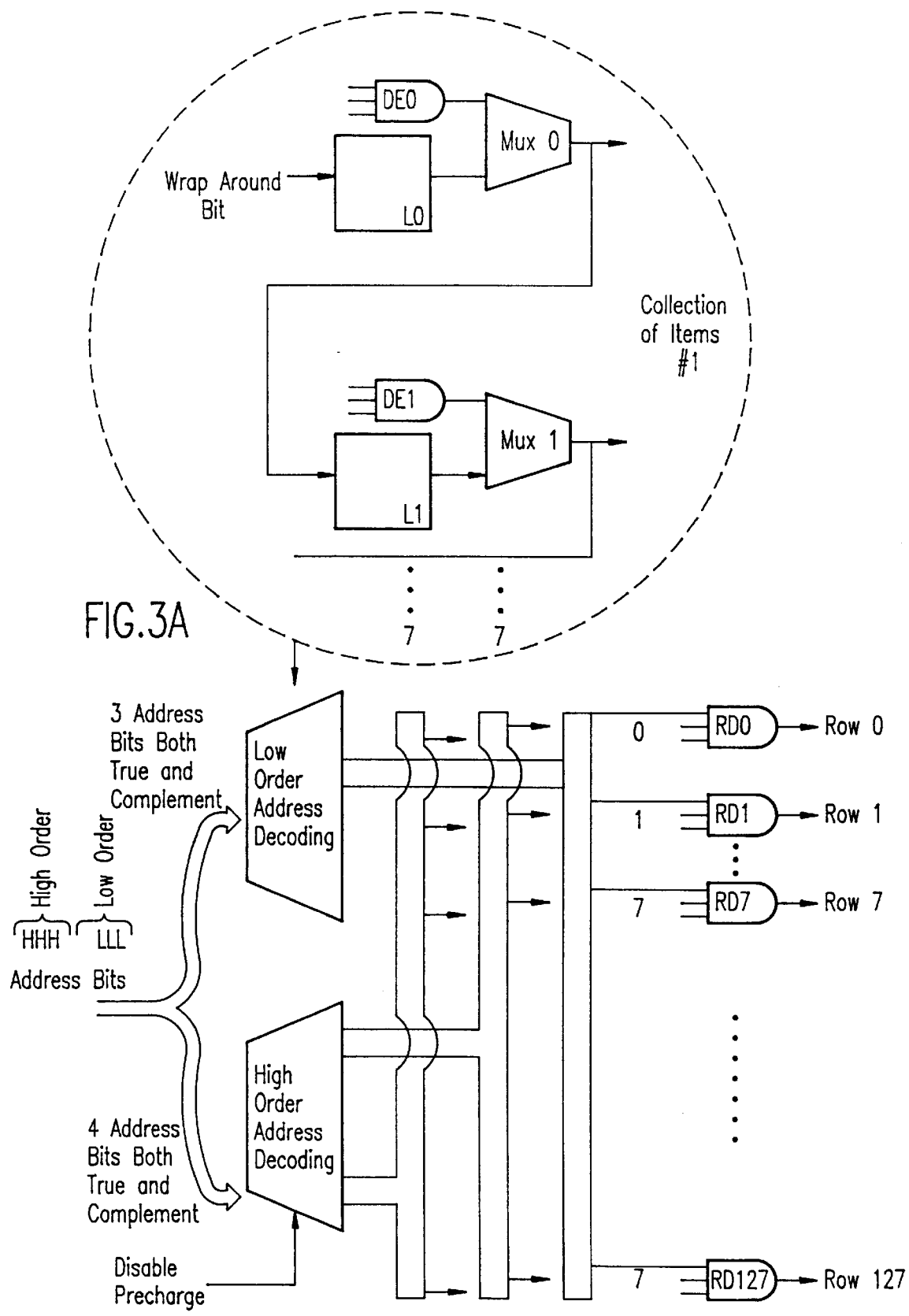
FIG. 3 is a block diagram a third embodiment of the invention.
FIG. 3A is a detailed block and logic diagram of the low order address decoder of the third embodiment.

A disadvantage of the first and second embodiments, FIGS. 1 and 2 respectively, is that each row driver requires a dedicated latch and multiplexer. For some applications, the additional circuitry may consume an excessive amount of silicon area. In these situations, assuming the decode exploits precharge circuits, one should consider a third alternative shown in FIG. 3. It operates on the principal that J's partially decoded higher order address signals may be preserved by foregoing their precharge. The least significant (lowest order) decoders, DEC0–7 as illustrated in FIG. 3A, must be precharged to facilitate the calculation of a new low order portion of the address field by the same means as the second embodiment shown in FIG. 2. In FIG. 3, let the J address request proceed normally, then capture the partially decoded lowest order bits into the register, formed out of latches L0–7 shown in FIG. 3A, by the same means as the second embodiment. Note that the shift of the address by one is accomplished by the wire interconnect. Once all the memory circuits are precharged for the next request, the new partially decoded address is applied to the row drivers, RD0–127 (FIG. 3), whose high order address bits are already in an active state since they were not precharged. One row driver out of the group of drivers RD0–127 evaluates causing one corresponding row, row 0–127, to go high.

In this third embodiment, the J+1 request must always be retrieved immediately following the J fetch request because the higher order signals of the partially decoded address are captured in the evaluated high order decoders; no new random address request can be made through the high order decoders until they are prepared (i.e., precharged) for another request. In the first and second embodiments, the latches in the row and column decode can store a completely decoded and thus independent address request for later use after more urgent random data or branch requests are honored.

Control mechanisms for the first two embodiments differ from the third in implementation because the third embodiment restricts incremental requests so that one must follow the next. In the first and second embodiments, a new sequential address strand can be captured in the row driver latches, held for an indefinite number of memory cycles, and launched later to retrieve the next incremental address.

Figure 4A:
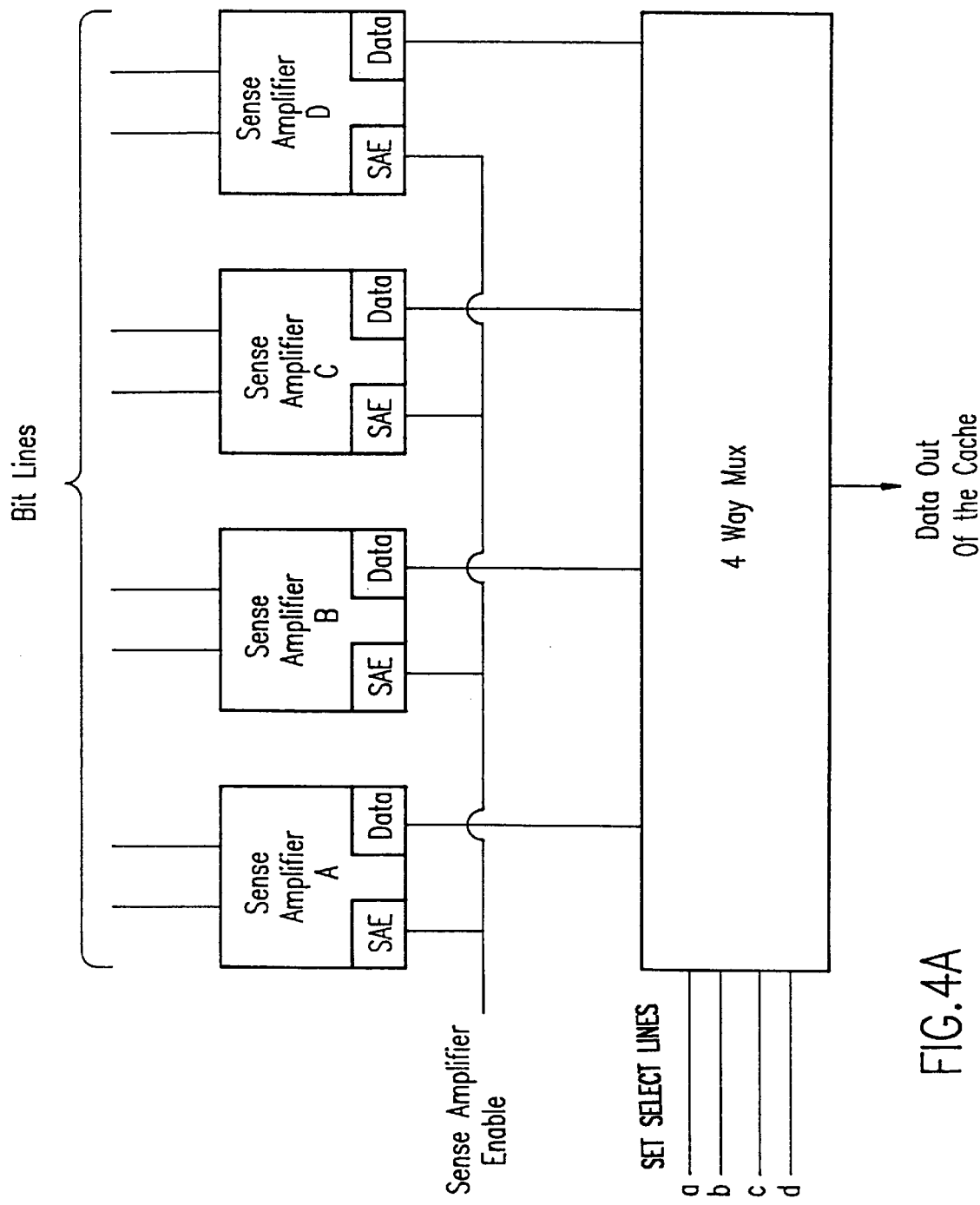
FIG. 4A is a block diagram showing the set selection circuitry at the output of the bit lines, and FIG. 4B a block diagram showing an alternative implementation.

An obvious benefit of all three embodiments is that less decode circuitry is used in subsequent incremental accesses, and thus a significant power savings is realized. For set associative caches, one further power saving measure can be integrated into the invention. For these memories, the last bits involved in the address decode arrive late within a memory cycle. Often in cache memory, the set select lines (also known as late select lines), the late arriving address signals, gate the processor cycle time. To insure these critical signals the shortest path through the memory, all the sets of data are read out in parallel through sense amplifiers A–D ,and wait for the set select line to choose which set should be driven out as shown in FIG. 4A. Looking one stage back from the multiplexer to the sense amplifiers, one should note that much power is expended sensing all sets in parallel instead of sensing only the single set required for the read.

Figure 4B:
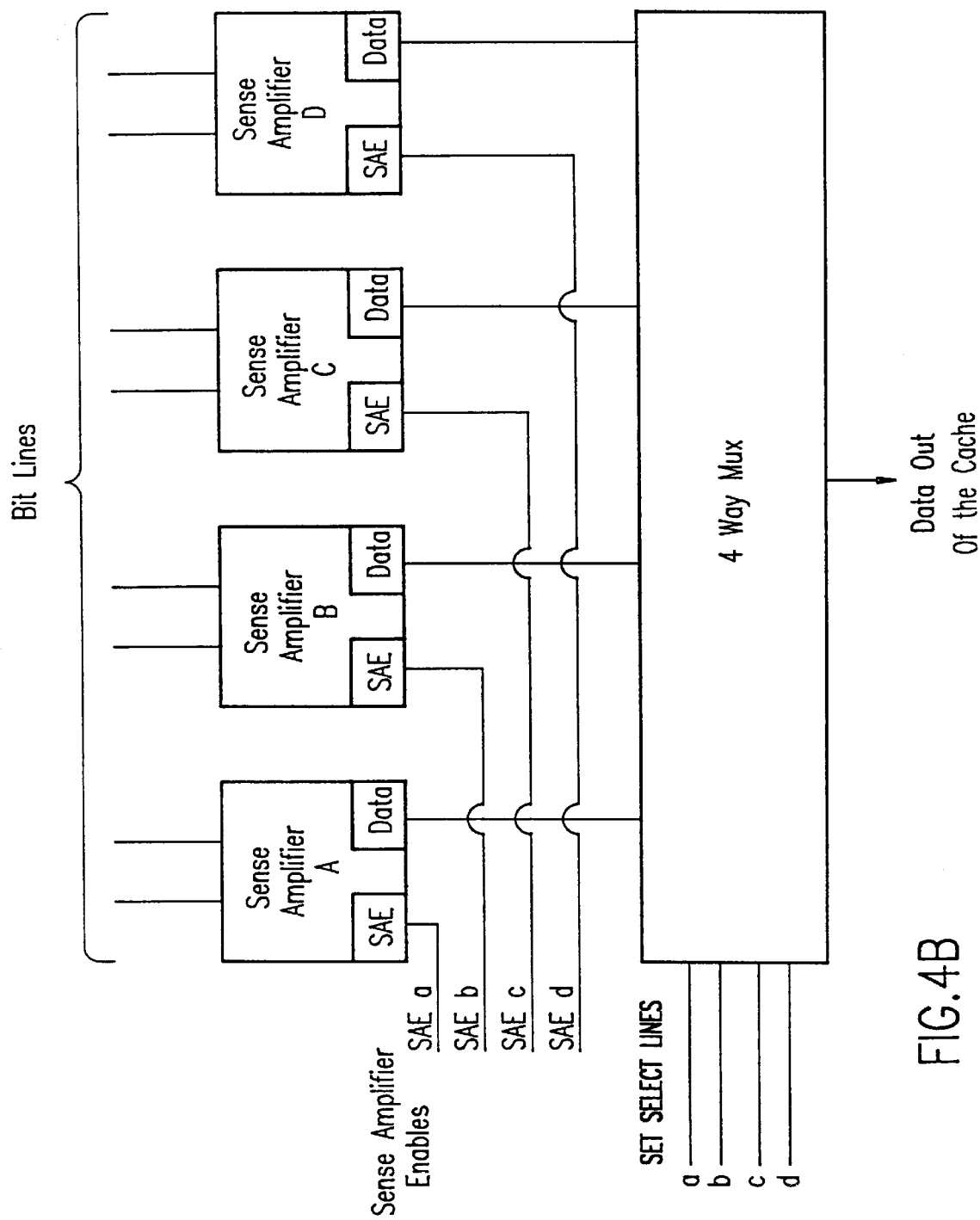

In FIG. 4B, given that set A, B, C, or D for the incremental fetch is known ahead of time, only those sense amplifiers pertaining to the single set of data being read out of cache have to be activated. The splitting of the sense amplifier enable lines to reduce the number of circuits fired in parallel is justified by the power savings realized. For example, suppose that a incremental fetch is requested from set A. Sense amplifier enable signal, SAE a, only needs to be activated for the plurality of sense amplifiers holding set A data. Sense amplifiers for set B, C, and D data are disabled during this request. The set select line a is activated to steer the set A data to the output. What looks like a redundant multiplexer structure of FIG. 4B accommodates the critical, late gating of one set C either A, B, C, or D to the data out the cache when the set select line is determined after the data passes through sense ampilier A-D as well as the power reduction achieved by sensing only the appropriate set when exact set is known ahead of time (incremental fetch).

Figure 5A:
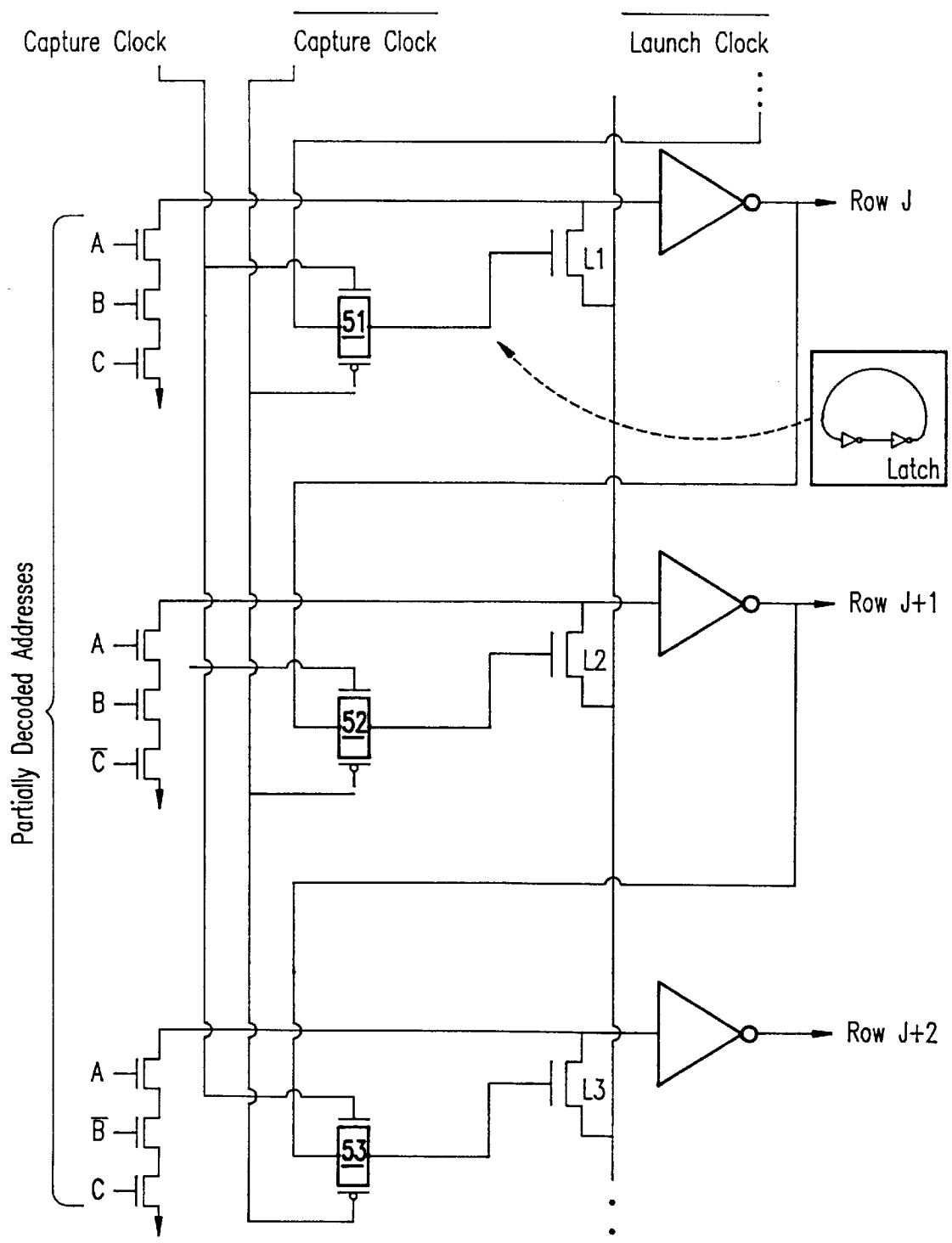
FIG. 5A is a circuit and logic diagram showing the latching structure which allows only one shift per address request.
Figure 5B:
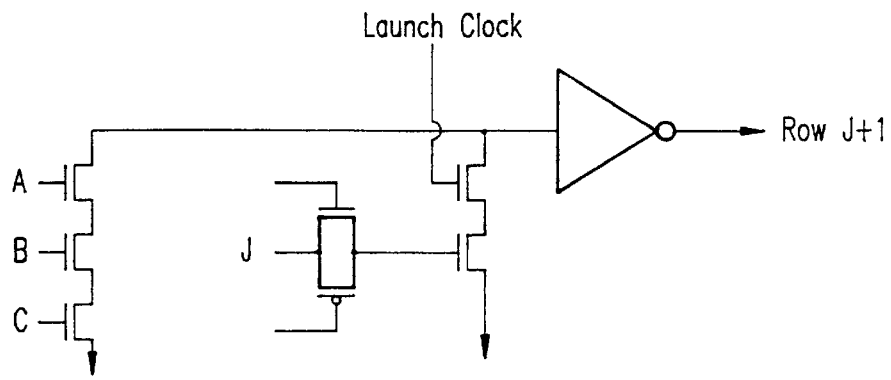
FIG. 5B is a circuit and logic diagram showing an alternative implementation.

FIG. 5A shows a latching structure which allows only one shift per address request. It is an efficient and effective means of implementing a J+1 request. The decoded address is passed through the active row driver. (Many other forms of shift registers are known to the art and can be applied to the address incrementation should one require a more flexible circuit structure.) The capture clock is activated during the time a row, J, J+1, etc., is active. The full pass gate, 51, 52, 53 allows decoded address bits to be stored on the gate of the launch transistor (L1, L2, L3) and, in the process, clears the earlier decoded address bits. Multiple instances of the box showing the back to back inverters forming a restoring latch can be attached to the latching nodes, the gates of transistors L1, L2, and L3, if the designer is concerned about dynamic charge storage as a means of latching. The launch clock is asserted when a incremental read is desired after the precharging of the bitlines is completed and the memory is prepared for another read. An obvious circuit alternative is shown in FIG. 5B where the launch clock is applied to a launch transistor in series with a transistor receiving the output of the pass gate.

Diverse implementations of this invention can be achieved by applying a combination of the following variations:

Attaching multiple launch transistors, pass gates, and latches to the same row decoder will support multiple streams of fetch requests.

Pass gate inputs can be driven from wordlines other than nearest neighbor allowing J+N continuation requests.

Each Launch transistor can have multiple pass gates feeding it to allow any J, J+1, J+2 request.

Figure 6:
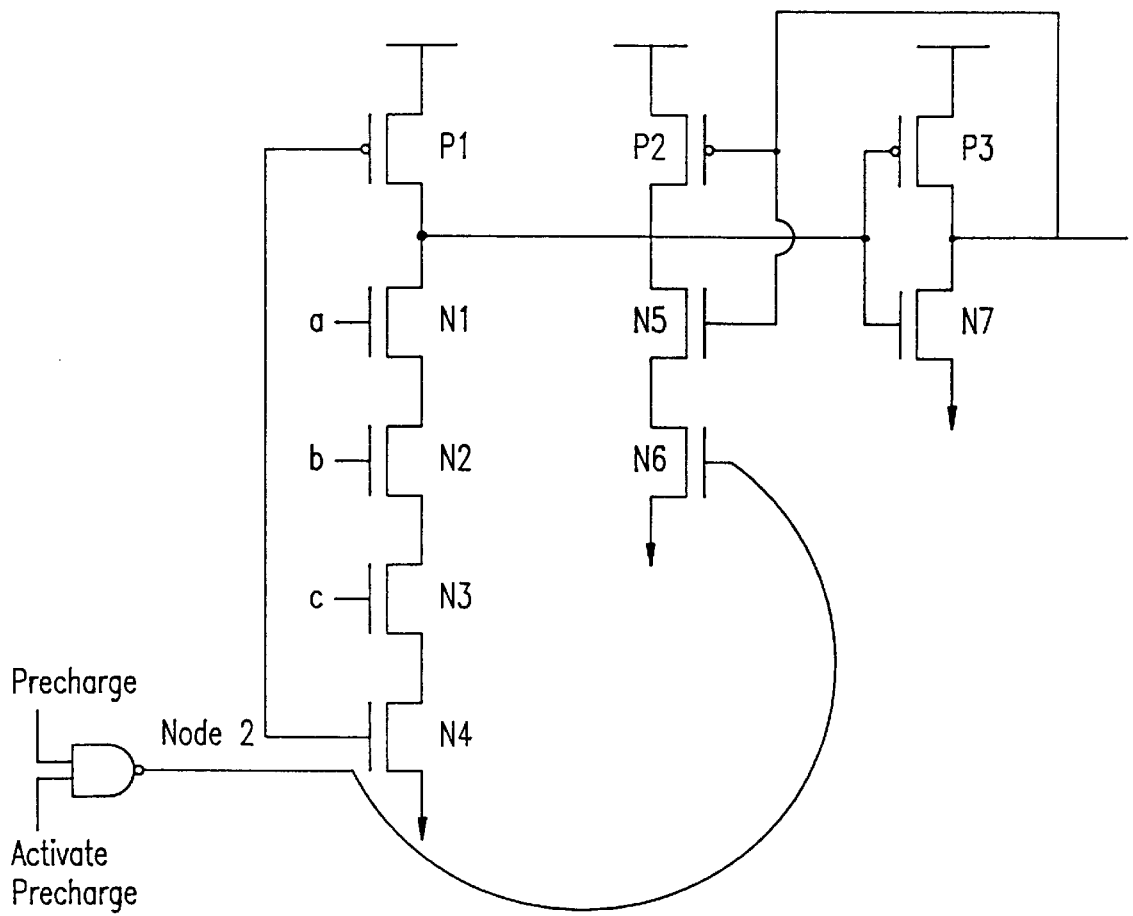
FIG. 6 is a circuit diagram showing a typical precharged address decode circuit according to the invention.

As was described in third embodiment shown in FIG. 3, to preserve the partially decoded higher order address signals of address J for the J+1 (N) access, the precharge to certain decoders is interrupted so that the decoder holds the higher order address signals active until after the incremental access is completed. FIG. 6 shows a typical precharged address decoder circuit with a precharge p-channel field effect transistor (PFET) P1 which precharges model high, a tree of n-channel field effect transistors (NFETs) N1, N2, and N3 which forms the logic function, ground interrupt NFETs N4 and N6 which disable the flow of current through NFETs N1, N2, N3, and N5 during precharge, latching FETs P2 and N5 which hold node 1 high or low after circuit precharge and evaluation is completed, and finally an inverter, formed out of FETs P3 and N7, which cleans up the noise and provides for monotonic signaling. The NAND gate attached to the gates of the precharge and ground interrupt transistors selectively enables or disables the precharge pulse to the circuit. When "Activate_Prechare" is low, the output of the NAND gate is always high which prevents the circuit from being precharged. To precharge the circuit, "Activate Precharge" must be asserted high, and then, a high active precharge pulse can be applied to the NAND gate which drives node 2 low activating P1 to pull node 1 high. The gating of the precharge can be done at any stage within a precharge clock circuit.

While the invention has been described in terms of three preferred embodiments, those skilled in the art will recognize that the invention can be practiced with modification within the spirit and scope of the appended claims.

Having thus described our invention, what we claim as new and desire to secure by Letters Patent is as follows:

1. A memory system that reduces power consumption by differentiating between a first and subsequent incremental fetch requests, comprising:

a memory array for storing a plurality of data blocks and from which said data blocks can be retrieved, said memory array receiving said first and said incremental fetch requests;

means for generating an external address for storing and retrieving said data blocks from said memory array;

a plurality of sets of sense amplifiers connected to said memory array for retrieving said data blocks, each said set comprising at least one sense amplifier;

means for enabling a single set or enabling each of said sets of sense amplifiers, wherein said incremental fetch request enables one set and said first fetch request enables each of said sets of sense amplifiers; and at least one multiplexor receiving an output from at least one set of said sets of sense amplifiers.

2. The memory system of claim 1 wherein said memory array comprises an N way set associative cache memory, N being an integer greater than or equal to two.

3. The memory system of claim 1, wherein said incremental fetch has a shorter set select signal generation latency than said first fetch.

4. The memory system of claim 1, wherein each said multiplexor receives one output from each said set of sense amplifiers, each said set of sense amplifiers having an associated set select line connected to each said multiplexor.

5. The memory system of claim 4, wherein early selection signals associated with said incremental fetch and late selection signals associated with said first fetch together in combination drive said set select lines.

* * * * *